United States Patent [19]

Lougheed et al.

[11] Patent Number: 5,194,908
[45] Date of Patent: Mar. 16, 1993

[54] DETECTING TARGET MOVEMENT

[75] Inventors: James H. Lougheed, Kinburn; Mark Wardell, Nepean, both of Canada

[73] Assignee: Computing Devices Canada Ltd., Nepean, Canada

[21] Appl. No.: 799,969

[22] Filed: Nov. 29, 1991

[51] Int. Cl.5 .............................................. G01P 3/36
[52] U.S. Cl. .................... 356/28; 364/525; 364/560; 358/105; 250/332
[58] Field of Search .................. 356/28; 364/525, 560; 358/105; 250/332

[56] References Cited

U.S. PATENT DOCUMENTS

| | | | |
|---|---|---|---|
| 4,064,533 | 12/1977 | Lampe et al. | 358/105 |
| 4,096,525 | 6/1978 | Lathan | 358/107 |
| 4,195,425 | 4/1980 | Leitz et al. | 356/28 |
| 4,253,249 | 3/1981 | Ashford et al. | 434/22 |
| 4,404,890 | 9/1983 | McAlpine | 89/41 |
| 4,580,894 | 4/1986 | Wojcik | 356/28 |
| 4,671,650 | 6/1987 | Hirzel et al. | 356/28 |
| 4,695,161 | 9/1987 | Reed | 356/254 |
| 4,695,256 | 9/1987 | Eichweber | 434/22 |
| 4,729,109 | 3/1988 | Adrian et al. | 364/560 |
| 4,866,639 | 9/1989 | Adrian | 365/525 |

OTHER PUBLICATIONS

"Bildalstrande malosökare söker rätt mal", FOA-tidningen, No. 3, Oct., 1987, pp. 34-35.

Primary Examiner—Mark Hellner
Attorney, Agent, or Firm—Thomas Adams

[57] ABSTRACT

In apparatus, such as a weapon sight, the speed of an object moving relative to a scene is determined by processing a plurality of successive frames of data, each obtained by scanning the scene, and detecting motion of the object relative to the background/foreground features of the scene. Each frame is compared with a reference comprising a different one of the frames and corresponding background features registered. Once the frames are registered, light intensity values of corresponding elements of the frames are subtracted. The registered background features, being stationary, cancel leaving the object features. Displacement of the object features over a predetermined number of frames is used to calculate the crossing speed of the object relative to the background features.

48 Claims, 12 Drawing Sheets

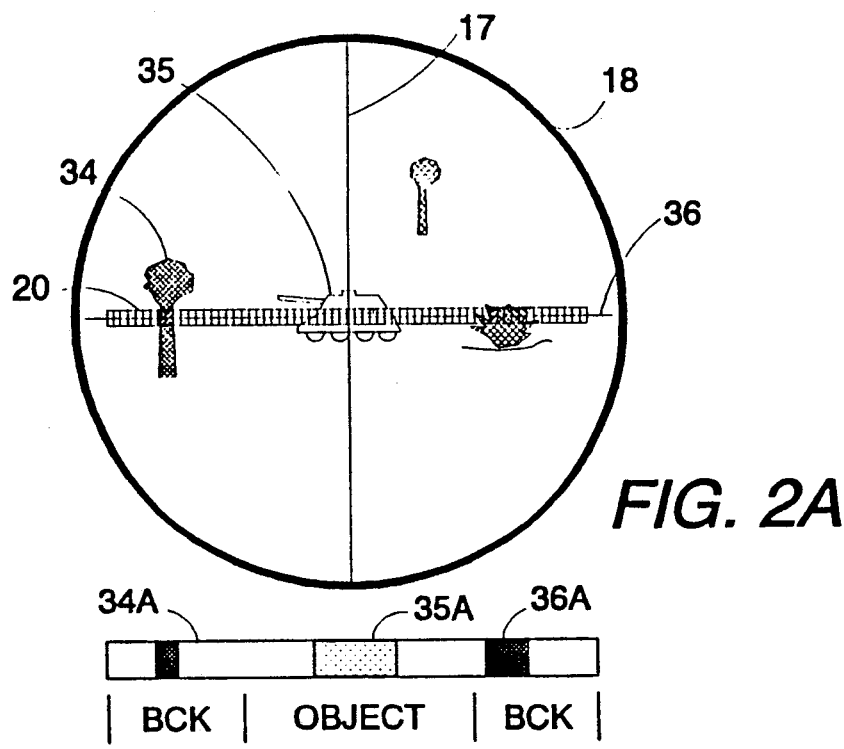
FIG. 2A
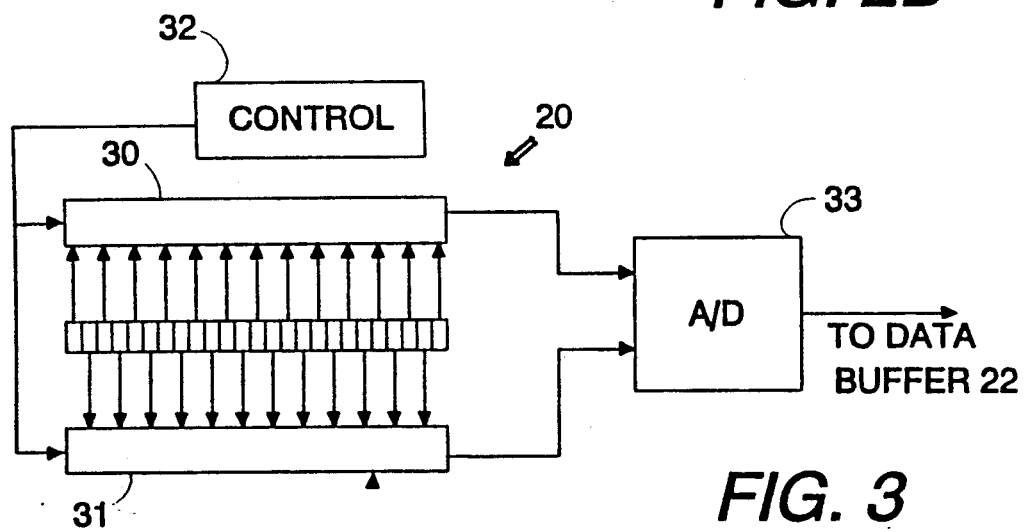
FIG. 2B
FIG. 3
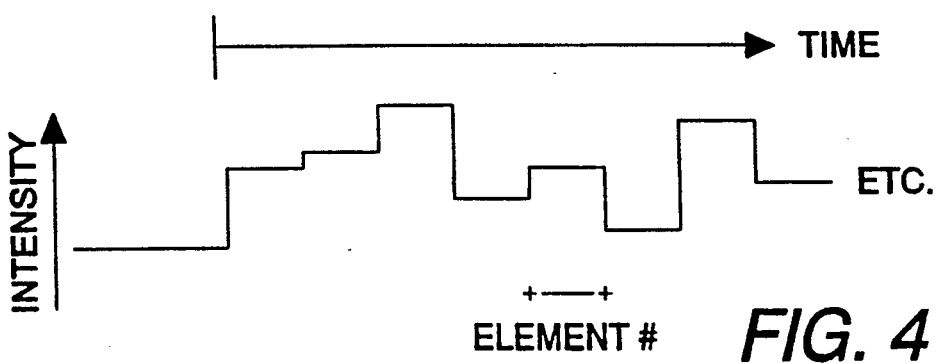
FIG. 4

DETECTING TARGET MOVEMENT

FIELD OF THE INVENTION

The invention relates to apparatus for determining the speed of an object moving relative to a scene and is especially, but not exclusively, applicable to targeting apparatus or sights for ballistic weapons, such as rifles, machine guns and anti-tank guns.

BACKGROUND

The invention is especially concerned with measuring the speed of an object as it moves across a line-of-sight when the sight itself is moving, e.g. panning. Such a situation arises with targeting apparatus which comprises a rangefinder (laser, radar etc.) and a ballistic microcomputer which, in use, processes data such as the type of ammunition, distance to target and wind speed, to compute the superelevation and lead angle required to place the round on target. It is desirable for the crossing speed of the target to be taken into account to allow for the fact that the target changes position after the round is fired. The weapon can then be aimed to lead the target position by a compensating amount.

Various approaches might be used to determine crossing speed. For example, the gunner could hold the sight still and time target motion relative to a scale in the sight. This lengthens the engagement time and imposes a steadiness requirement which may be hard to meet with a hand-held weapon.

U.S. Pat. Nos. 4,253,249 and 4,695,256 disclose weapons training simulators in which movement of the target across the line-of-sight is computed for the purpose of assessing the accuracy with which the gunner aimed the weapon. In the system disclosed in U.S. Pat. No. 4,253,249, crossing speed is obtained by measuring the movement of the gun turret as the gunner tracks the target. This technique would not be entirely satisfactory "in the field", since it would require lengthy tracking, gunner skill, a ground reference and an angle transducer. In the system disclosed in U.S. Pat. No. 4,695,256, crossing speed is obtained by detecting laser "echoes" returned from the target. This would not be entirely satisfactory "in the field" because it would require lengthy engagement time, gunner skill, and steadiness.

U.S. Pat. No. 4,404,890 issued September, 1983 (McAlpine) discloses a fire control system in which a computer calculates the required gun lead angle. Two images are superimposed within an optical sight. One is of the field of view and the other is of a pattern which is movable relative to the display by adjustment devices controlled by the operator. A disadvantage of this system is the need for manual adjustment by the operator.

OBJECT OF THE INVENTION

The present invention seeks to overcome, or at least mitigate, the afore-mentioned disadvantages and provide a novel apparatus and method for computing crossing speed of an object relative to a scene and which is particularly suitable for use in conjunction with a sight for a weapon.

SUMMARY OF THE INVENTION

According to one aspect of the present invention, apparatus for determining the speed of an object moving relative to a scene, for example the field of view of a weapon sight, includes:

means (20, 21, 22) for providing a plurality of frames of data representing successive images of at least a portion of the scene, each frame comprising an object segment, in which features of the object predominate, and a background segment comprising parts of the frame excluding the object segment and in which features of the object do not predominate;

means for effecting registration of features in a background segment of one of said plurality of frames with corresponding features in a background segment of a reference frame comprising a different one of said plurality of frames;

means for determining displacement of features in said object segment of said one of said plurality of frames relative to the registered background segment features; and means for computing, from the displacement of the object features over a predetermined number of frames, the speed of movement of the object relative to the background features.

According to a second aspect of the invention, a method of determining the speed of an object moving relative to a scene comprises the steps of:

providing a plurality of frames of data representing successive images of at least a portion of the scene, each frame comprising an object segment, in which features of the object predominate, and a background segment comprising parts of the frame excluding the object segment and in which features of the object do not predominate;

effecting registration of features in a background segment of one of said plurality of frames with corresponding features in a background segment of a reference frame comprising a different one of said plurality of frames;

determining displacement of features in said object segment of said one of said plurality of frames relative to the registered background segment features; and computing from the displacement of the object features over a predetermined number of frames, the speed of movement of the object relative to the background features.

The sensor means for providing images may comprise a linear CCD array positioned to provide linear scan images for a line of pixels extending horizontally across the scene, conveniently aligned with a horizontal crosshair in the case of a weapon sight. The array may be scanned repeatedly to provide the successive frames of data as a series of digital representations of the light intensity at elements of the array.

A correction may be applied to compensate for differing sensitivities of the individual elements of the sensor, especially when a CCD array is used.

In a weapon-aiming system the operator may move the sight itself, either inadvertently or in following the target. In this situation, all of the light intensity values may be changing i.e. the various features are in different places in different frames, or those over the target may even be constant if the gunner is tracking it perfectly. Determination of the relative displacement of the foreground/background features permits registration of these features of the successive frames followed by an attempt to detect motion of the target object.

Assuming that the operator is competent, the target object is likely to be near the middle of the field of view, in which case the middle of the scene will correspond to the object segment. The background segment will then correspond to the outer parts of the scene.

The relative sizes of the object segment and background segment may be adjusted in dependence upon the range to the object, as determined, for example, by a coupled rangefinder.

In weapon aiming systems embodying the invention, a ballistic computer may be provided for computing a lead angle correction in dependence upon the speed of the target relative to the line-of-sight of the weapon. The system may continuously recalculate the ballistic solution and adjust the aim point until the weapon is fired.

Registration of the background segment consists of finding and aligning significant features that are presumed to be stationary from frame to frame. Typically these features are in the foreground and/or background of the scene but remote from the target object. In this specification, such features will be referred to as "background features". It follows that the "background segment" may also include features of the foreground and may be discontinuous.

In preferred embodiments of the invention the registration process involves a series of "trial" registrations in which the intensity values of the subject frame are incrementally displaced, relative to the intensity values of the reference frame. The intensity values of corresponding elements of the subject frame and the reference frame are subtracted at each incremental displacement position. The magnitudes of the differences are then summed (Sum of Absolute Differences or SAD) and the minimum sum indicates the optimum registration. As the registration is repeated upon a predetermined number of frames, the displacements which gave the optimum registration for respective frames are accumulated. The cumulative displacement factor then represents the displacement of the most recently registered frame relative to an initial reference or datum frame.

When the frames are optimally registered, the subtraction of corresponding light intensity values from one frame to the next will substantially eliminate stationary background features but not moving object features. The relative displacement of these object features can then be determined over a predetermined number of frames to estimate the crossing speed of the object.

The quality of the registration may be verified by, for example, measuring the flatness of the SAD (Sum of Absolute Differences) curve, especially in the vicinity of the minimum, for the preferred trial registration. Preferably, the ratio between the mean of all the SAD values found during registration and the minimum registered value is used as an index of flatness. Generally, the SAD curve for a valid registration will exhibit a trough. The sharper the trough, the greater the degree of confidence in the registration.

In order to improve registration accuracy, for example despite vertical sensor movement and for high crossing speeds when some scene features may move out of the field of view, the reference frame may be updated periodically, preferably from frame to frame. In particular, an initial frame, for example the frame which coincides with an event such as range measurement, may be used as the reference against which to register a subsequent frame. Once the subsequent frame has been registered, it is adopted as the new reference.

In determining object motion, the displacement of each object feature may be recorded over a period of time i.e. several frames. A linear regression may then be performed on these object feature displacements, the slope representing their displacement relative to time, and any missed data points interpolated. The slope thus represents the object speed relative to the scene.

For an extended uniform target object, the object features might be leading and trailing edges of the object, which would show as opposite intensity difference transitions when the frames were subtracted. The mean of the leading and trailing edge displacements may be computed and used to indicate the location of the object segment during registration.

A registration process similar to that used on the background segment may be performed upon the "object" segment in determining its motion.

The spatial configuration, for example aspect ratio, of the sensor elements may be selected to suit the characteristics of the background terrain and/or target object. For example, individual elements of the horizontal CCD array (or other image-capturing means) may have a height that is greater than their width, e.g. 4:1. Since vegetation (trees, bushes, grasses, etc.) tends to grow upright, a "tall" sensor gives a better response because it is spatially matched and so gives better signal-to-noise ratio, or greater response, to such features. Also, "tall" sensors are more likely to continue to overlap the target object despite moderate vertical movement or jitter of a handheld sight.

The foregoing and other objects, features, aspects and advantages of the present invention will become more apparent from the following detailed description, taken in conjunction with the accompanying drawings, of a preferred embodiment of the invention.

BRIEF DESCRIPTION OF DRAWINGS

FIG. 2A illustrates the field of view of the sight and, superimposed, the area of the field of view sensed by the sensor, which is aligned with a cross-hair of the sight;

FIG. 2B illustrates the corresponding output of the sensor;

FIG. 3 is a detail view of a CCD sensor and interface;

FIG. 4 illustrates the output of the CCD array;

FIG. 13 is a flowchart depicting statistics accumulation; an

DESCRIPTION OF PREFERRED EMBODIMENT

Figure 1:
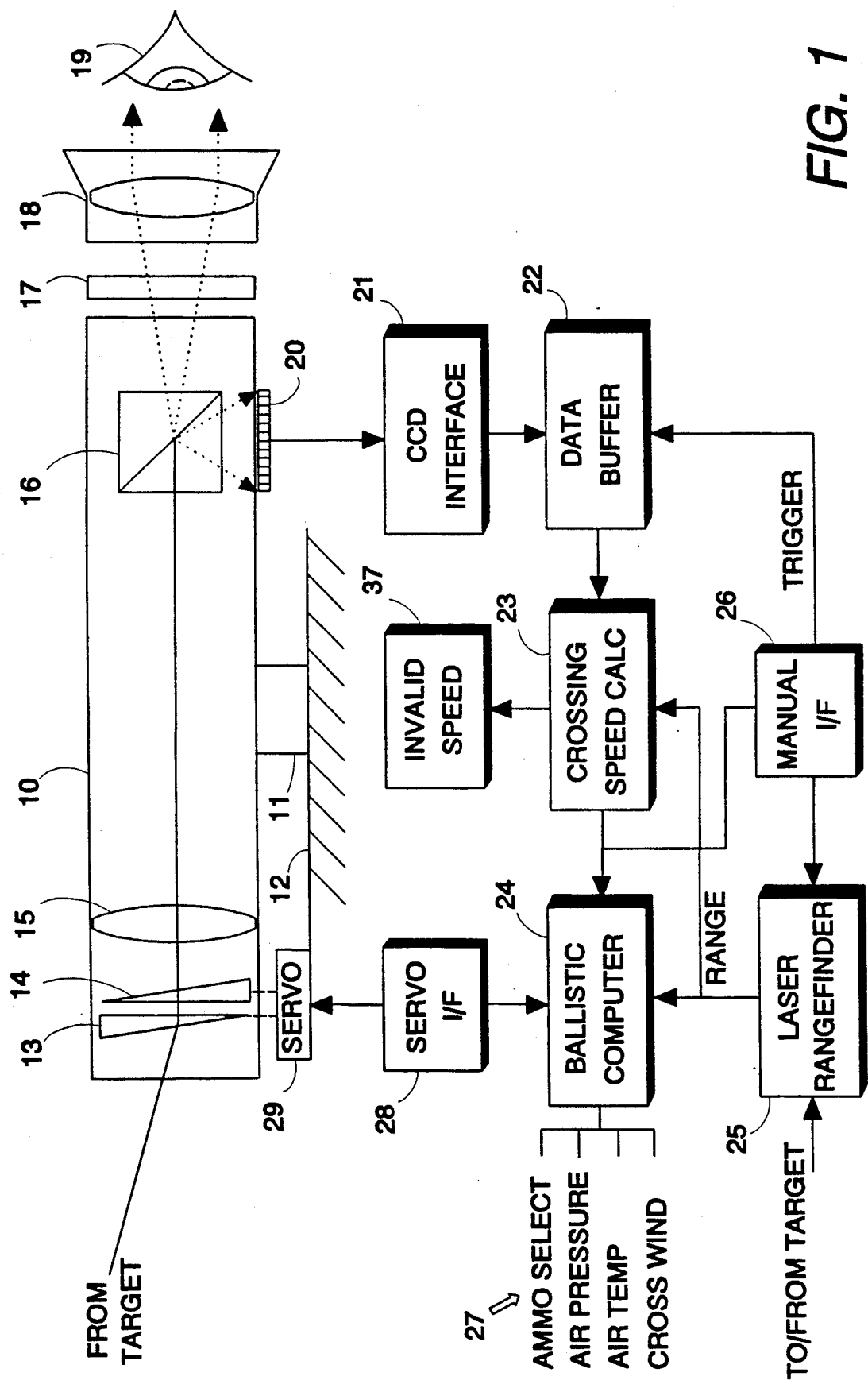
FIG. 1 is a schematic diagram of a weapon aiming system comprising a sight, a sensor and means for processing sensor output signals.

Referring to FIG. 1, weapon aiming apparatus includes a sight 10 attached by a mount 11 to a weapon 12, for example a rifle, anti-tank gun or other weapon of the ballistic kind. The optical components of the sight 10 comprise, in sequence, a pair of wedge-shaped prisms 13 and 14, an objective lens 15, a beam splitter 16, a cross-hair reticle 17 and an eyepiece lens 18, all aligned along the optical axis of the sight 10. Light from the field of view of the sight 10, including the target object, passes through the prisms 13 and 14, and the objective lens 15, and impinges upon the beam-splitter 16, which transmits a portion through the reticle 17 and eyepiece 18 to the eye 19 of the operator or gunner. The beam-splitter 16 also reflects a portion of the light to a sensor 20 mounted at the side of the sight 10. The sensor 20 conveniently comprises a linear array of charge-coupled devices. The position of the sensor array 20 relative to the beam-splitter 16 is such that the array extends across the horizontal centre line of the image seen by the gunner 19, which is illustrated in FIG. 2A. It will be seen from FIG. 2A that the gunner 19 sees the cross-hairs of the reticle 17 superimposed upon the field of view. It should be appreciated, however, that the gunner does not see the sensor array 20. It is shown in FIG. 2A solely to illustrate the part of the image which is "seen" by the sensor 20.

Figure 5:
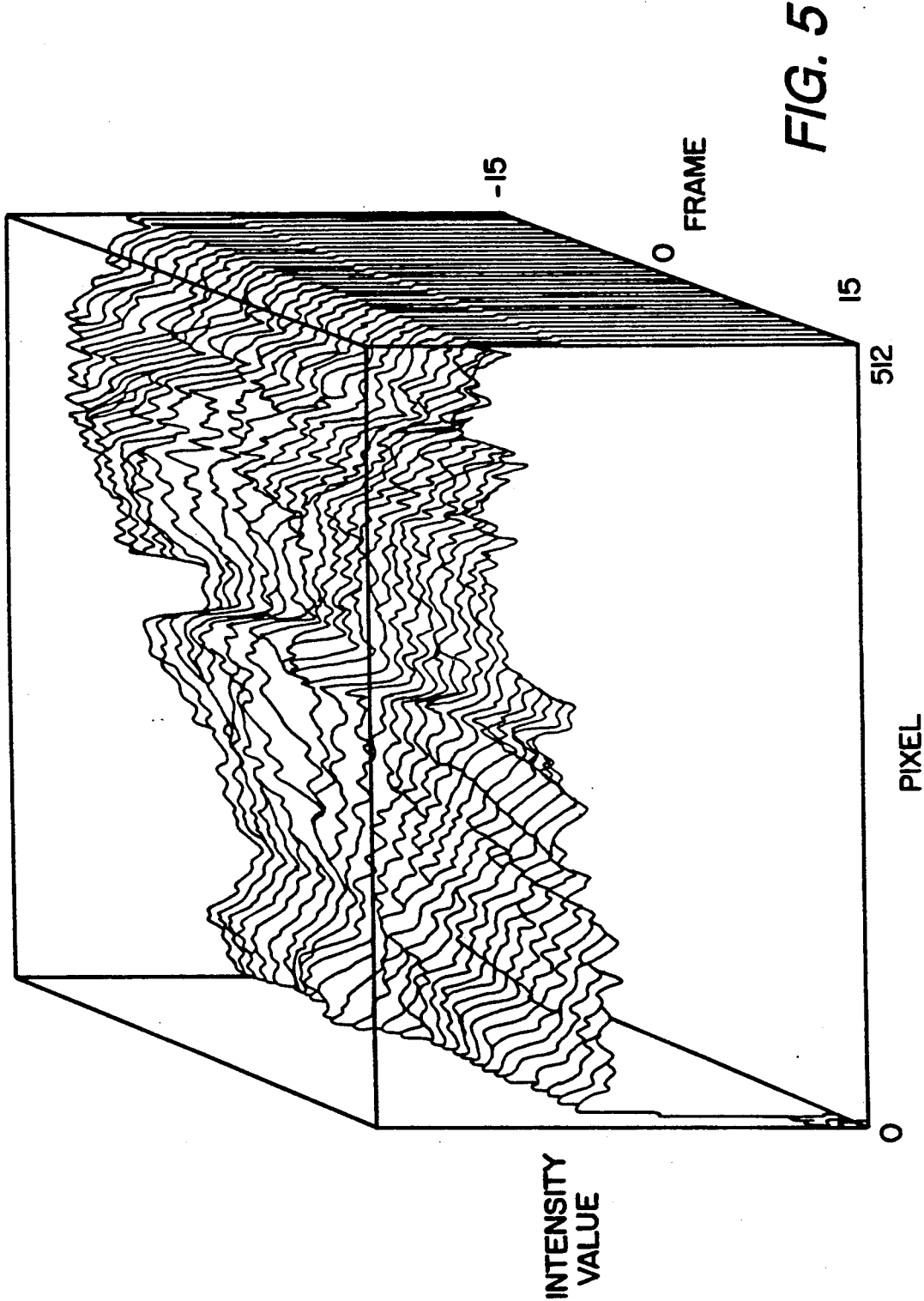
FIG. 5 illustrates actual frames of data from the sensor.

Referring again to FIG. 1, the output of sensor 20 is processed by a CCD interface 21 to produce a digital signal comprising a digitized index value or light intensity value for each element of the array. The sensor 20 and CCD interface 21 are shown in more detail in FIG. 3. The sensor 20 comprises a pair of multiplexers 30 and 31, respectively, controlled by a control device 32. Each of the multiplexers 30 and 31 has its inputs connected to alternate elements of the sensor 20 and its output connected to an analogue-to-digital converter 33, the digital output of which is supplied to the data buffer 22 (FIG. 1). The elements of the sensor 20 are scanned to produce a multilevel analogue signal as illustrated in FIG. 4, each level of which comprises a light intensity value corresponding to a particular element of the sensor 20. The digital equivalent of the linear scan image will be referred to hereafter as a "frame". Each frame of data represents the variation in light intensity along the horizontal cross-hair 36 of reticle 17. The sensor 20 is scanned to produce a succession of linear scan images, each comprising one complete set of light intensity values corresponding to the number of elements in the CCD sensor 20, typically 512 or 1024. The sensor array 20 is scanned at a rate of 30 Hz, though it will be appreciated that other rates could be used. FIG. 5 illustrates a plot of the sensor data for a small vehicle moving from right to left. For the purpose of describing the system, however, a much simplified version is depicted in FIG. 2B.

Referring to FIG. 2A, in the eyepiece, the horizontal cross-hair intersects the images of a tree 34, a tank 35, which is the target object, and a bush 36. Consequently, the single scan image of sensor 20 shown in FIG. 2B has three groups of pixels, 34A, 35A and 36A, corresponding to the tree 34, tank 35 and bush 36, respectively.

Figure 6:
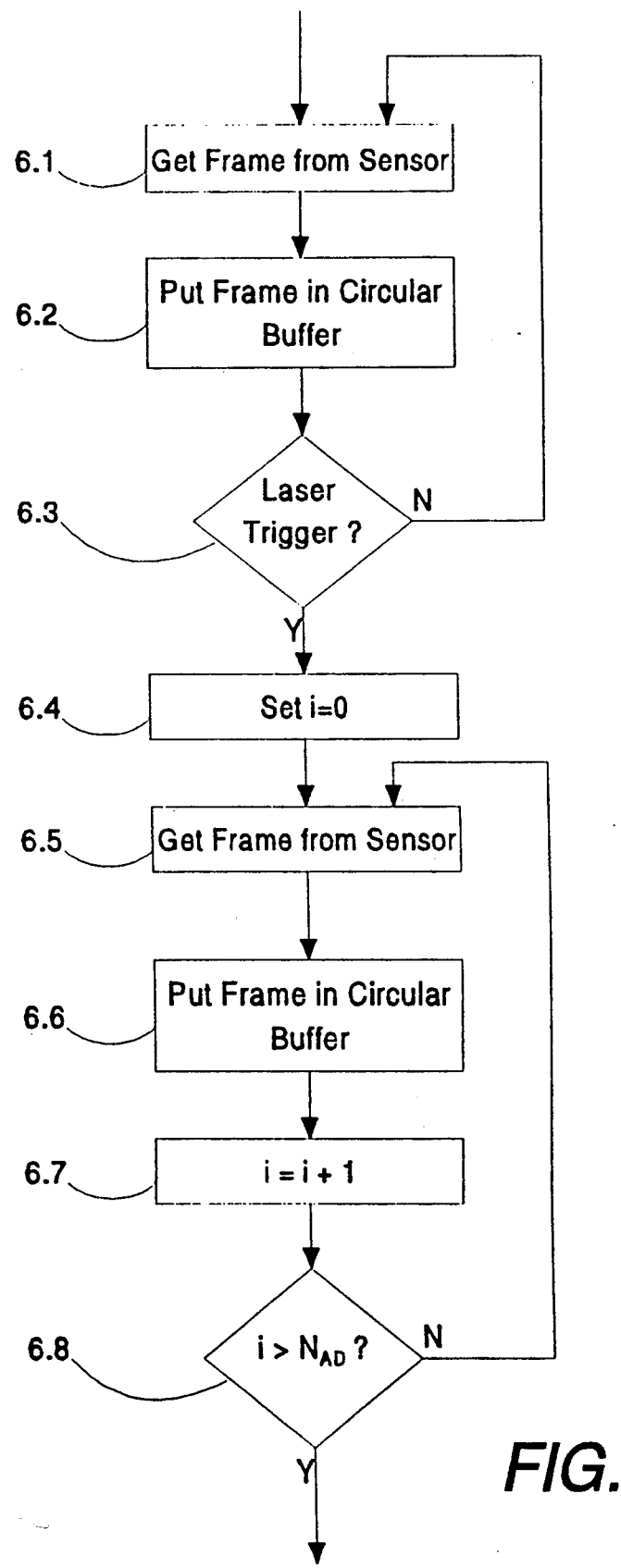
FIG. 6 is a flowchart depicting buffering of frames of data from the sensor.

The frames are buffered by circular buffer 22 before being processed by a crossing speed calculator 23. Operation of the buffer 22 is illustrated in the flowchart of FIG. 6. The frames pass through the buffer 22 on a first-in, first-out basis. At any instant, the rotating buffer 22 stores thirty-one frames.

The scanning of the sensor 20 and passing of frames through buffer 22 is continuous so long as the sight is switched on (steps 6.1, 6.2). When the gunner 19 wishes to fire a round, he first activates a laser rangefinder 25 (see FIG. 1), by way of a manual interface 26, to determine the range to the target. The laser rangefinder 25 detects the distance between the target and the sight in a known manner and supplies the range to crossing speed calculator 23 and ballistic computer 24. The manual interface 26 simultaneously supplies a trigger signal to the buffer 22. The frame which coincides with the trigger, which will be referred to as the "lase" or datum frame, is designated as frame 0. As illustrated in FIG. 6, once it has been triggered, step 6.3, the data buffer 22 continues to accept frames (Steps 6.4 to 6.8) until the number of stored frames after the lase frame is equal to $N_{AD}$ which, in this specific embodiment, is preset to 15. Since the capacity of the buffer 22 is thirty-one frames, the number of stored frames which were received before the lase frame will also be 15. The frames in buffer 22 are "frozen" and crossing speed calculator 23 processes them to derive the crossing speed of the target, i.e. the speed of the target 35 relative to the background terrain seen by the sight 10. For processing, each frame is given a number according to its temporal position, frame number "−1" immediately preceding the lase frame and frame number immediately following the lase frame.

Figure 9A:
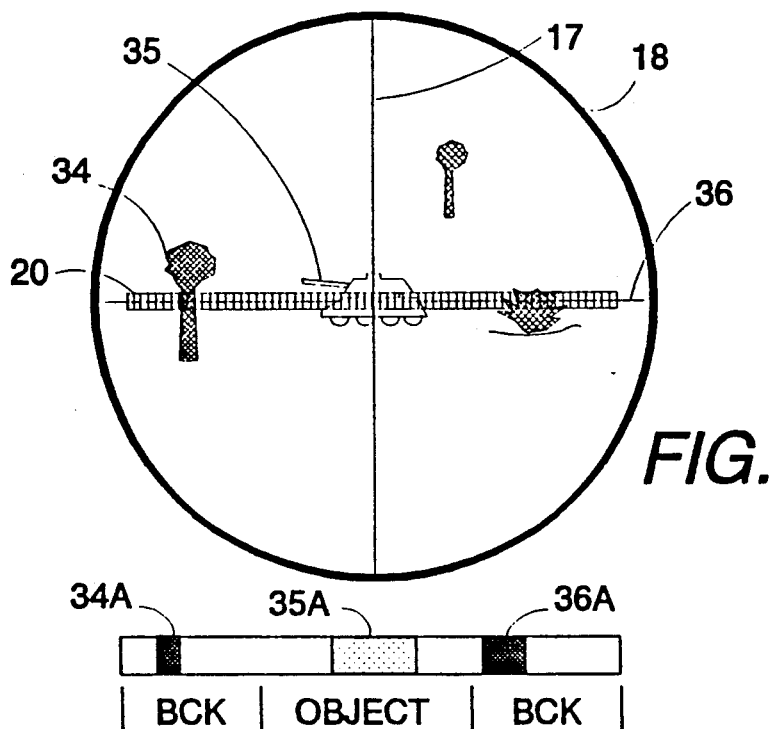
FIGS. 9A-9E illustrate a registration sequence for the sensor data.

Because the operator must activate the rangefinder 25 when the crosshairs are on the target object, it follows that the target object 35 is centred on the reticle cross hairs in the "lase" frame 0 (see FIG. 9A). This assumption is important since it allows the target region to be separated from the background on the basis of likely size and position, as will be described in more detail later with reference to FIG. 12.

Referring again to FIG. 1, the crossing speed calculator 23 calculates the crossing speed and supplies it to the ballistic computer 24, which also receives other data 27, namely the kind of ammunition selected; the air pressure and temperature; and the cross wind speed. This list is not exhaustive. Other parameters, such as barrel temperature, might be included. The other data 27 may be supplied to the ballistic computer 24 manually, for example from manual interface 26, or automatically from one or more transducers.

Ballistic computer 24 uses the other data 27 and the crossing speed to compute the required amount of superelevation and lead angle, then supplies drive signals to a servo interface 28 which operates servos 29 to rotate the pair of prisms 13 and 14 relative to each other. This relative rotation has the effect of shifting the image in the eyepiece 18 relative to the reticle 17. The gunner 19 adjusts the position of the weapon 12 to center the cross-hairs on the target object again and, in so doing, applies the required superelevation and lead to the weapon 12. With the crosshairs centered on the target again, the gunner 19 may operate the weapon to fire the round.

The whole process is very quick and relatively straightforward. The gunner need only concentrate upon having the cross-hairs centred upon the target when operating the laser rangefinder and again when actually firing the weapon. It is not necessary to maintain the cross-hairs on the target throughout the intervening period. The key to this speedy, simplified operation is the fact that the system is capable of determining the crossing speed of the target object automatically by registration of scene features in successive frames followed by measurement of the displacement, relative to these registered scene features, of features which correspond to the target object.

The operation of the system will now be described in more detail with reference to FIGS. 7 to 14. For convenience, the symbols and abbreviations used for process variables, constant thresholds and implementation dependent values are listed at the end of this description. Also, the term "background" will be used for those parts of the scene which exclude the object, even though they could include foreground features as well.

Figure 7:
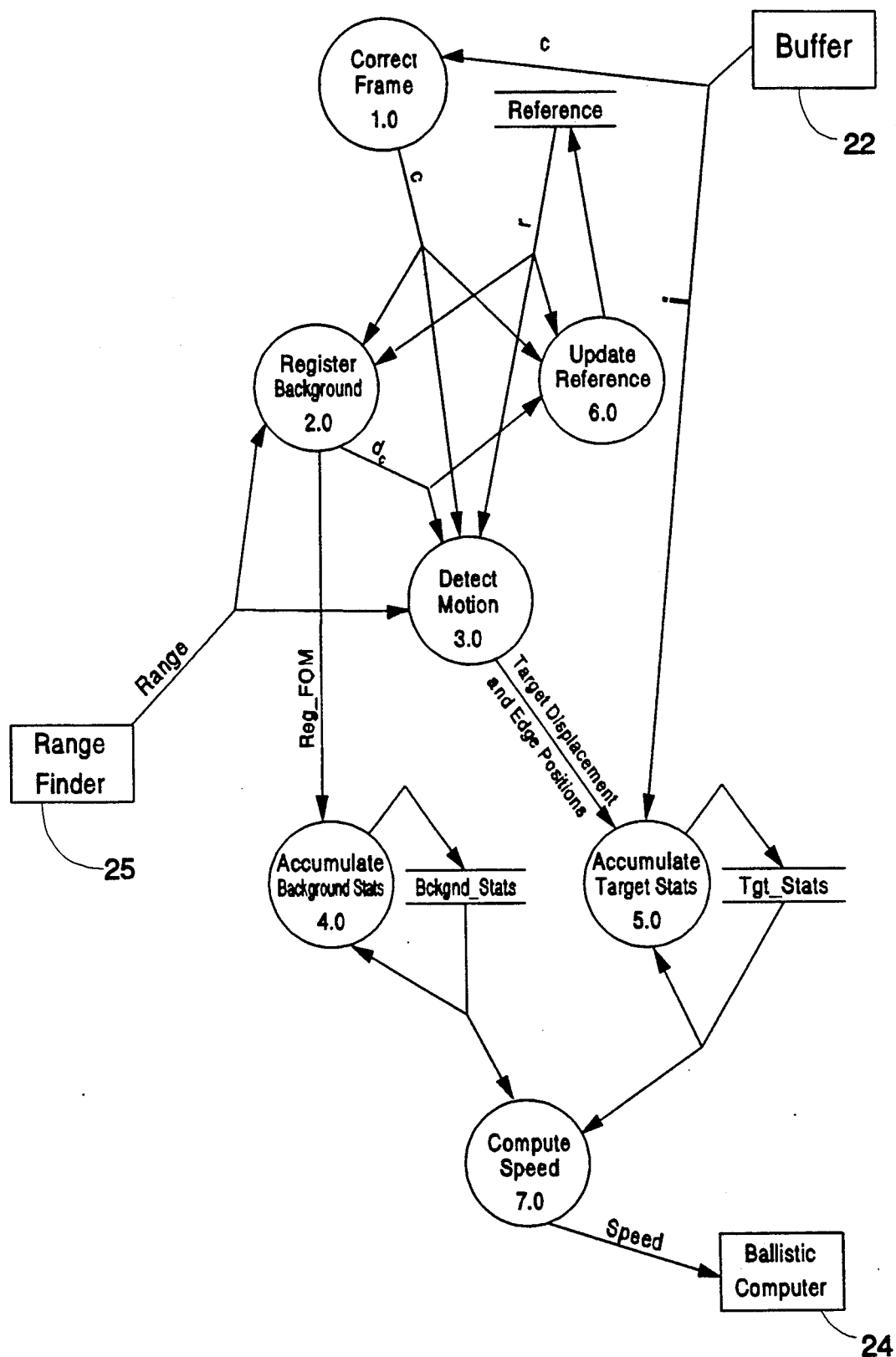
FIG. 7 is a data flow diagram depicting operation of the system.

In the system data flow diagram, FIG. 7, data flows are represented by lines with arrows indicating direction, transformations of data are represented by circles, and stores of data are represented by parallel lines. Specifications 1.0 to 6.0, Correct Frame, Register Background, Detect Motion, Update Background Statistics, Update Target Statistics and Update Reference, respectively, are performed for each frame of data from buffer 22. Specification 7.0, Compute Speed, is performed only when all frames have been processed.

Specification 1.0, Correct Frame, is necessary because CCD sensors suffer from significant pixel-to-pixel non-uniformity because different pixels have different output vs light intensity transfer characteristics. This is inherent in their manufacture, due primarily to inaccuracies in etching. The non-uniformity is dominated by a linear gain component which is unique to each pixel and time independent. During registration, the lack of uniformity of the sensor could lead to inaccuracies since the registration process would tend to align "features" generated by the non-uniformity. This would be particularly significant with low contrast backgrounds where the non-uniformities would dominate the actual background data possibly causing a false registration. Correction factors are obtained by sampling the sensor element responses for a high intensity diffuse illumination and a low level diffuse illumination. The correction factor required to transform each element output to the average element output for each illumination condition is then computed and subsequently used by process 1.0, Correct Frame, to correct for lack of uniformity. The correction factor will be fixed since the non-uniformity, being due primarily to manufacturing variables, will be specific to the particular sensor.

Thus process 1.0, Correct Frame, receives the frames from the buffer 22 and corrects each pixel by applying a correction factor comprising an individual fixed gain and offset value. Typically, the gain accounts for 5-10 per cent change in intensity, and the offset value contributes less than 1 per cent of the change.

Figure 8:
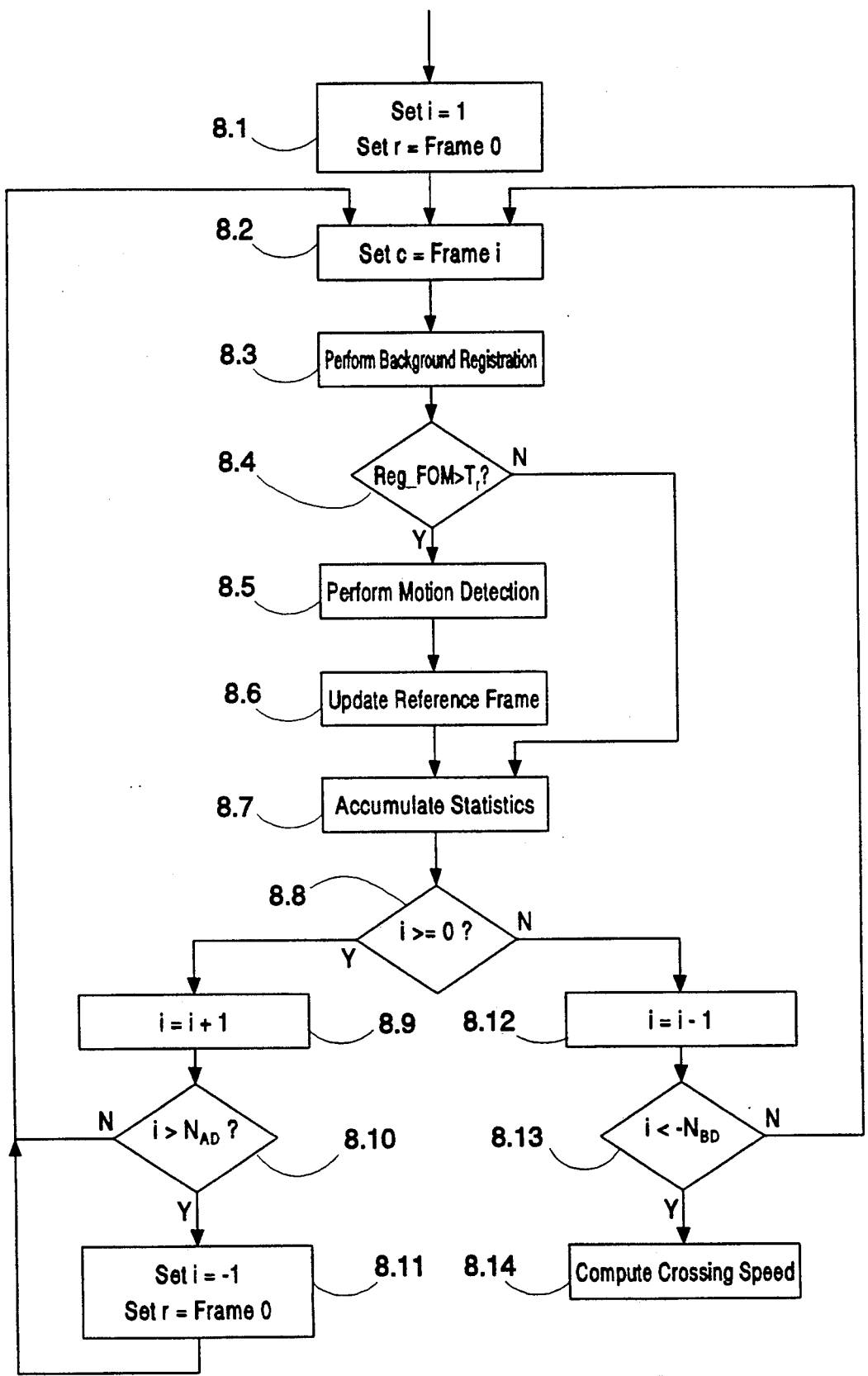
FIG. 8 is a flowchart depicting crossing speed calculation.
Figure 14:
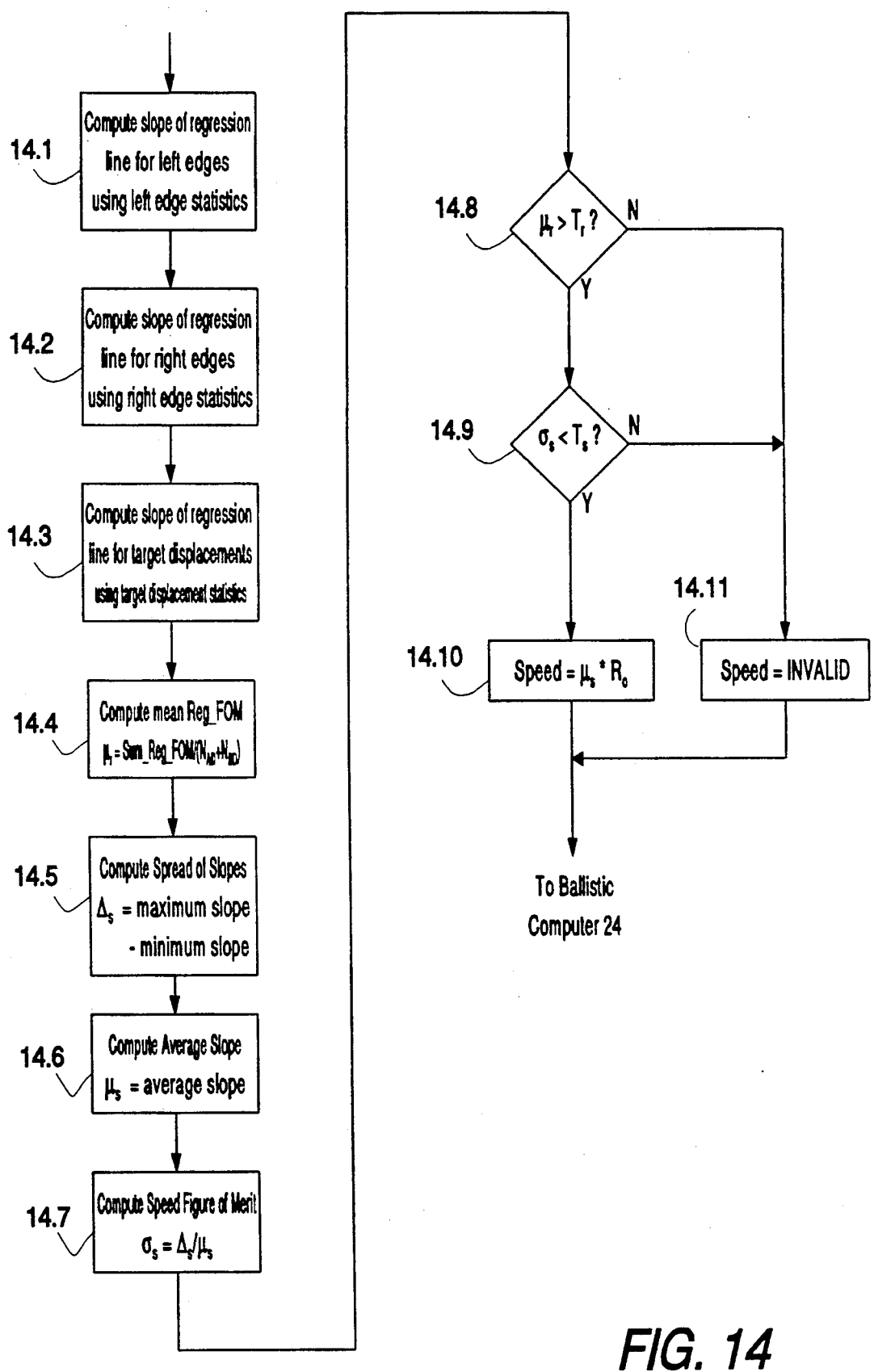
FIG. 14 is a flowchart depicting crossing speed computation.

Referring now to the flowchart of FIG. 8, the crossing speed calculator 23 initially selects the lase frame 0 as the reference frame r, step 8.1, and selects the current frame for registration with the reference frame (steps 8.2 and 8.3). Step 8.4 validates the registration by comparing a registration Figure of Merit with a threshold $T_r$. If the frame is registered successfully, step 8.5 detects motion of the target object, and step 8.6 substitutes the newly-registered frame as the reference r instead of the lase frame 0. Step 8.7 accumulates statistics of the motion detection and the registration Figure of Merit to be used to compute speed and assess the validity of the crossing speed measurement (FIG. 14).

A loop including steps 8.9 and 8.10 causes steps 8.2 to 8.7 to be repeated for all of the post-lase frames $N_{AD}$, in increasing numerical order. For each frame, the reference is the most-recently successfully registered frame. When all fifteen have been processed, step 8.11 reselects the lase frame 0 as the reference and selects the first of the pre-lase frames, frame −1, for registration with it. The loop comprising steps 8.12 and 8.13 causes steps 8.2 to 8.7 to be repeated for all fifteen of the frames $N_{BD}$ prior to the lase frame 0. When all frames have been processed, step 8.14 computes the crossing speed. It should be appreciated that the lase frame 0 is used only as a reference.

Figure 9B:
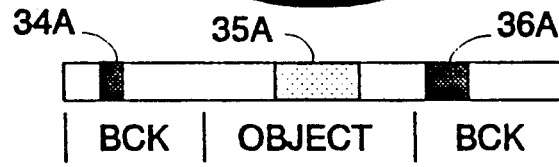
Figure 9C:
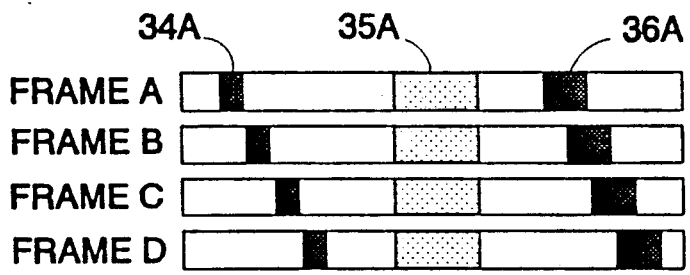
Figure 9D:
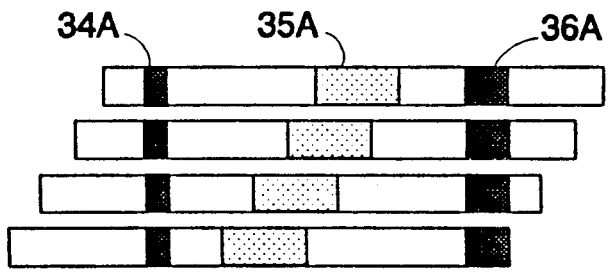
Figure 9E:
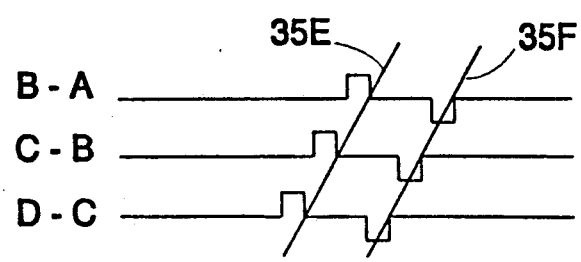
Figure 10:
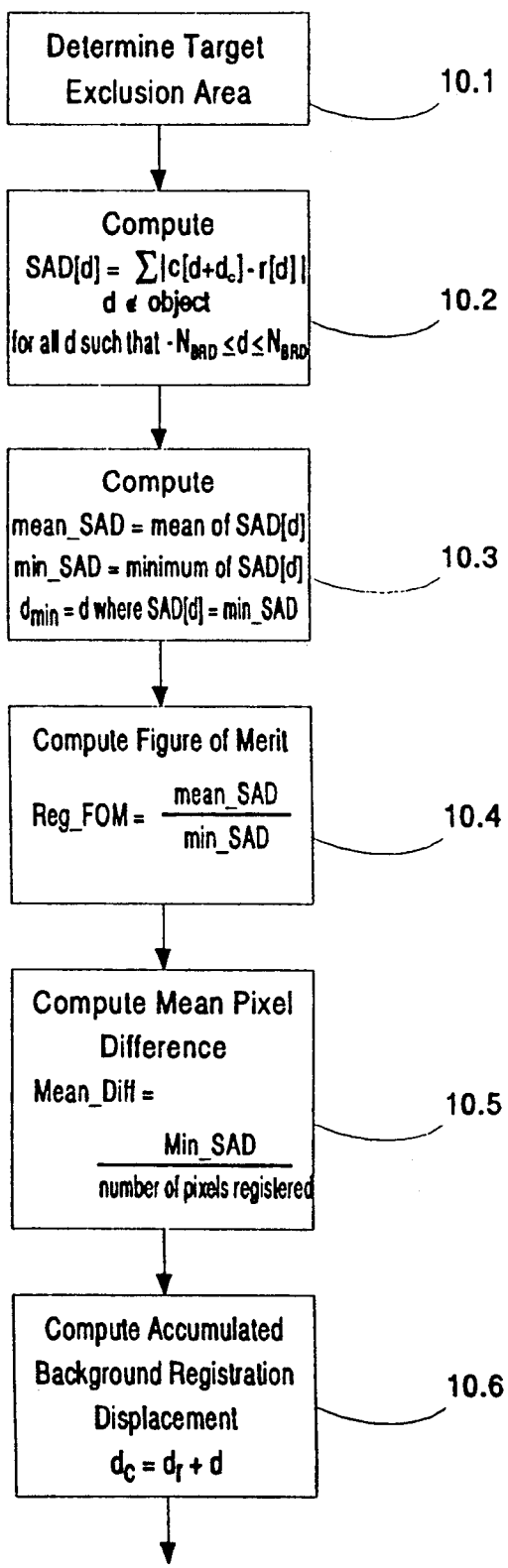
FIG. 10 is a flowchart depicting background registration.
Figure 11:
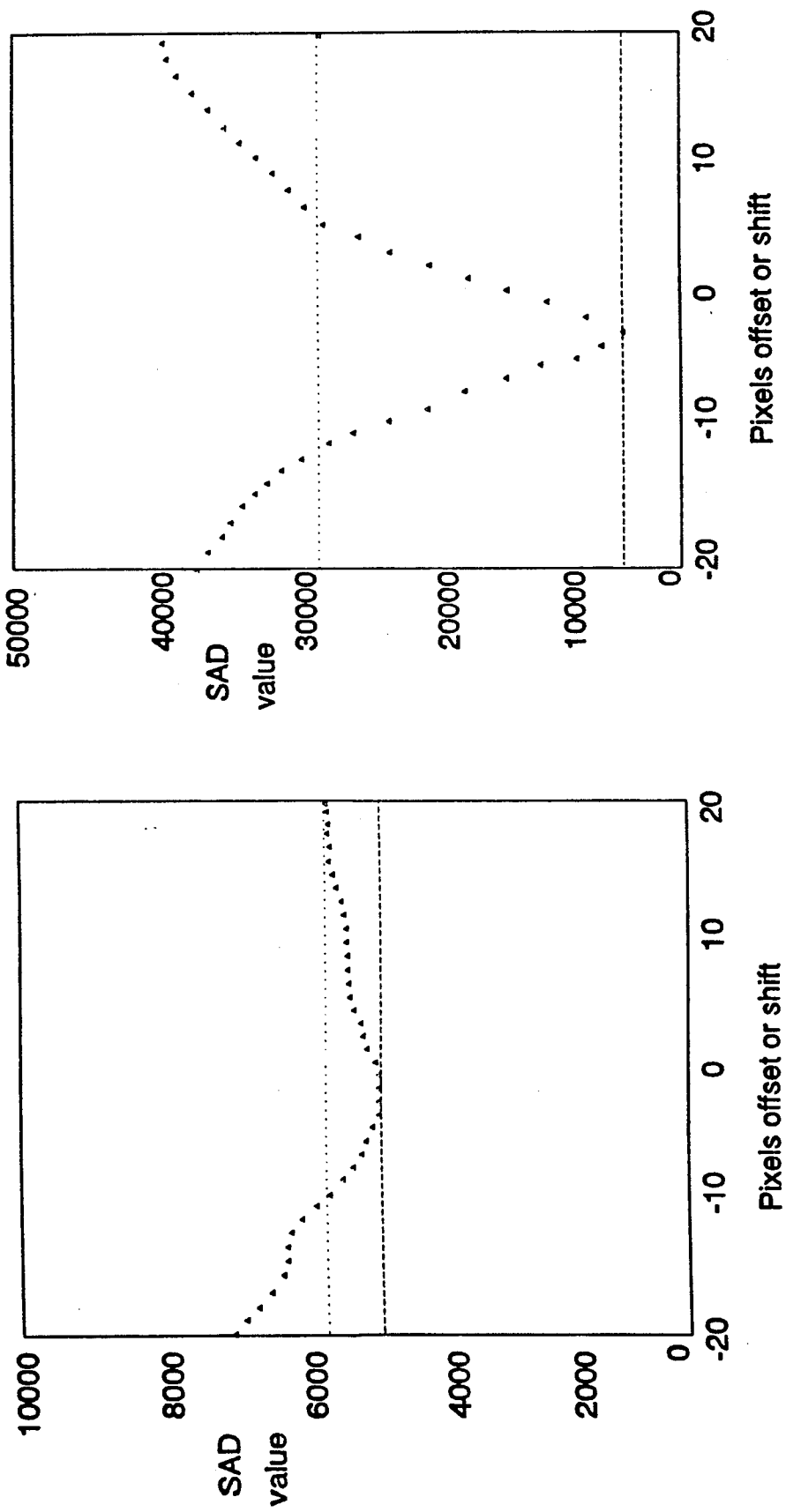
FIGS. 11A and 11B are plots of SAD (Sum of Absolute Differences) for poor and good registrations, respectively.

Registration step 8.3 is shown in more detail in FIG. 10. Step 10.1 determines the background segment of the current frame from the target range and target centre. As mentioned previously, for the purpose of performing registration, step 8.3, it is assumed that the target is more or less centred in the field of view, as shown in FIG. 9A, when the buffer 22 is triggered. This assumption is valid because the rangefinder laser beam is quite narrow and will not give a valid return unless it is accurately aimed at the target. For the very first frame, the target centre is assumed to be the centre of the field of view, i.e. the centre of the cross-hairs. For subsequent frames, the target centre is that determined for a previous frame by step 8.5, Motion Detection, to be described in detail later. On that basis, a group of pixels in the middle of the frame, identified as an "OBJECT" segment in FIG. 9B, are initially excluded from consideration. The remaining pixels are the background segment, identified as BCK in FIG. 9B, which are deemed to correspond to background or foreground features and hence are processed to effect registration. The relative sizes of the BACKGROUND segment and the OBJECT segment are determined by range and predicted target centre and may be adjustable to suit differing conditions.

As the target 35 moves, to the left as shown in FIG. 9A, the gunner 19 moves the weapon, and with it the sight 10 to follow the target 35. Consequently, in successive frames A, B, C and D, the bands of pixels 35A, 35B, 35C and 35D representing the target 35 remain in the middle of the field of view. The bands of pixels 34A to 34D, representing the tree 34, and the bands of pixels 36A to 36D representing the bush 36, are displaced in the opposite direction i.e. to the right in FIG. 9C. It will be seen that, if the frames A, B, C and D are displaced so that the background features 34A, 36A are aligned, or registered, as in FIG. 9D, the relative displacement of the object features 35A between frames can be determined.

It should be noted that the gunner 19 does not need to move the weapon to follow the target for the system to work. Such movement is described so as to better illustrate how the system works.

Referring again to FIG. 10, in order to effect registration, step 10.2 offsets the current frame relative to the reference frame over a number of incremental offsets or displacements "d", the actual number being predetermined to take account of anticipated target speed, range and optical characteristics of the sight. Commencing with the frames aligned, and then displacing them $N_{BRD}$ steps in opposite directions, step 10.2 determines the absolute difference in light intensity values of aligned elements of the current and reference frames and the Sum of Absolute Differences (SAD) of these intensity values for the background areas at each displacement position, as follows:

$$SAD_d = \Sigma |c[d + d_c] - r[d]|$$

d OBJECT for all d such that $-N_{BRD} < d < N_{BRD}$, where r is the reference frame, c is the current frame and d is the displacement or offset. The frames are considered to be optimally registered when the SAD value is a minimum.

FIGS. 11A and 11B illustrate typical curves of SAD against displacement for less distinct and distinct registrations, respectively, for a total of forty different positions, i.e. $N_{BRD} = 20$. Each point on the curve represents the SAD value computed for that particular displacement "d". A distinct registration is characterized by a sharp transition between a minimum value and the flatter areas either side of the minimum. Hence a sharp "trough", as shown in FIG. 11B, indicates a reliable registration. That illustrated in FIG. 11A, however, would be suspect because the "minimum" is not distinct i.e. several displacements give the same SAD.

Referring again to FIG. 10, the quality of registration of each frame is checked by calculating Figure of Merit (FOM) as the ratio between the mean of all SAD values found during registration of the frame and the minimum SAD value (Steps 10.3 and 10.4). This ratio exhibits low values for flat SAD curves as shown in FIG. 11A thus indicating poor quality registration. This SAD flatness method, being thus normalized, is particularly robust and is independent of background intensity and sight panning rates. As previously mentioned, this FOM for each frame is compared with a fixed threshold $T_r$ (Step 8.4). If the FOM exceeds the threshold, the registration is declared reliable, and the current frame becomes the reference for the next frame (Step 8.6, FIG. 8 and Update reference 6.0 in FIG. 7). It will be appreciated that the registration should be reliable or any error in a frame adopted as a reference will be propagated as a component of all frames subsequently registered directly or indirectly to that frame. The displacement d which gave the minimum SAD value, and the FOM, are recorded for use in computing speed (Step 8.7). In addition, the mean intensity difference between aligned pixels, i.e. the SAD minimum divided by the number of pixels registered, is computed (Step 10.5). This gives a measure of the overall intensity between aligned frames which will be used later as a threshold relative to which intensity differences will be measured in the process of detecting motion (see FIG. 12, Step 12.3).

Figure 12:
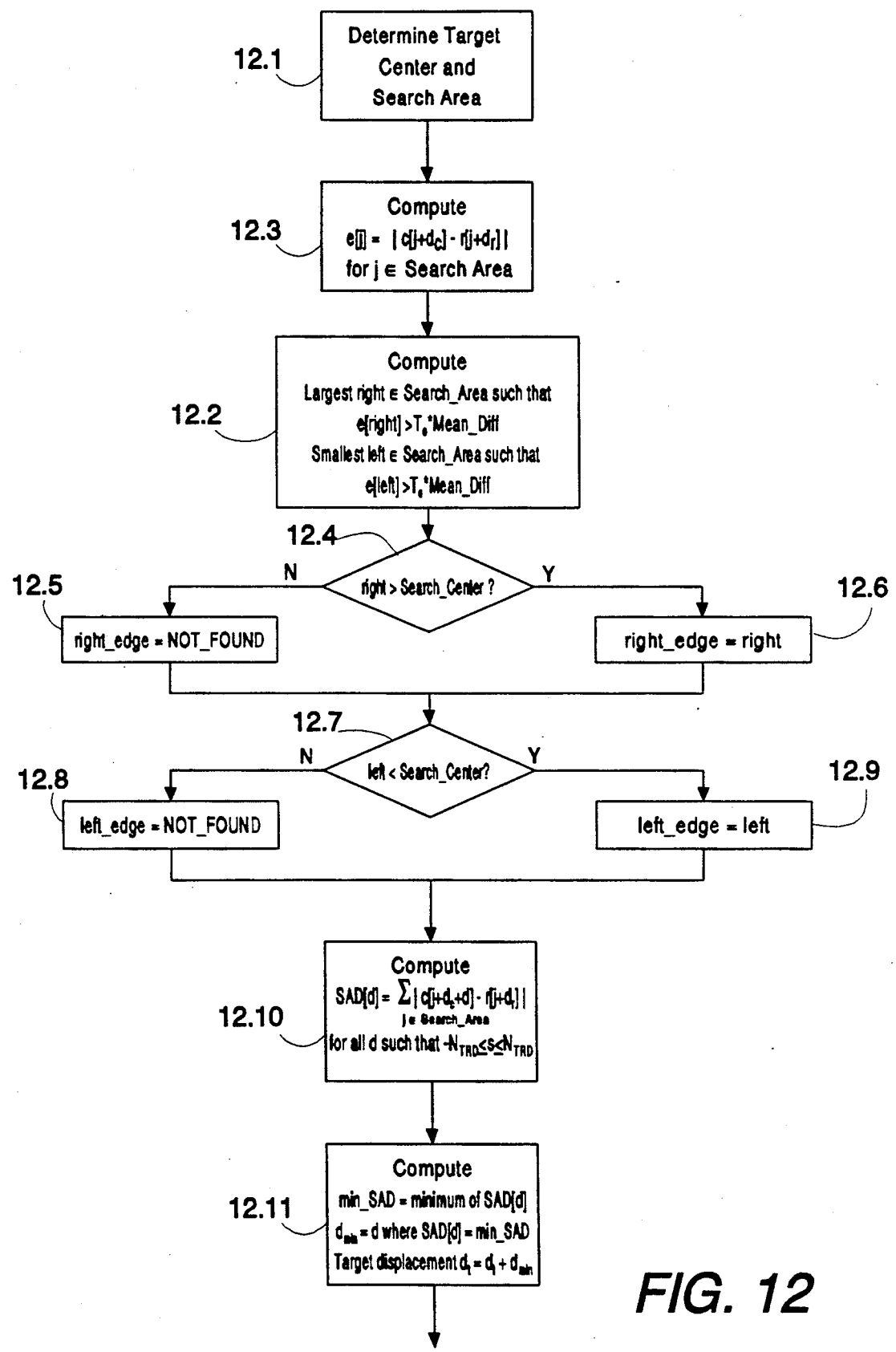
FIG. 12 is a flowchart depicting motion detection and object/target registration.

Once the background segment of the current frame has been registered, motion detection is performed upon its object segment (Step 8.5). Referring to FIG. 12, step 12.1 determines the object segment about a target object or search centre. The size of the object segment is determined by dividing a scale factor by the target object range. As mentioned previously, for the very first frame, the centre of the cross-hair is taken as the target object centre. Thereafter the target object centre is the mean between the leading and trailing edges of the target object derived from the previous frame.

To locate the leading and trailing edges of the target object, the differences in individual intensity values between the reference and current frames when offset by the displacement "d" corresponding to registration are first determined (Steps 12.3 and 12.2). In step 12.3, the differences are compared with positive and negative thresholds and the leftmost edge 35E and rightmost edge 35F (FIG. 9) detected. Each threshold is derived by multiplying the mean intensity difference (determined during background registration, step 10.5) by a fixed factor T° which is determined empirically. Detecting the edge positions gives a more stable indication of the target extremities than, for example, a mean of a cluster of "edges" since vertical jitter could cause the mean to vary if the target is non-uniform.

Figure 13:
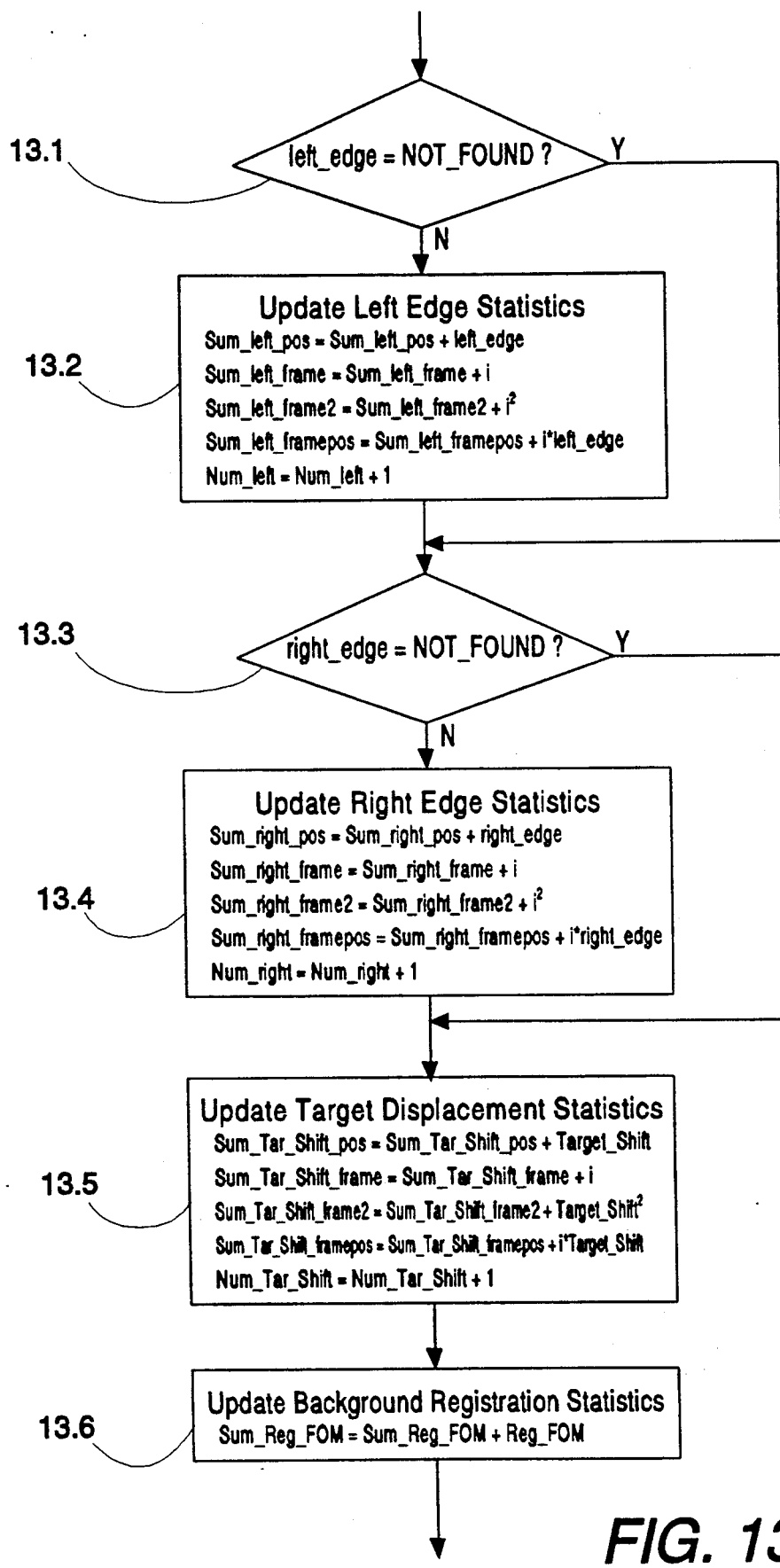

A separate registration process, step 12.10, is performed in the object segment. Since the object segment is dominated by pixels with target object information, and the frames have already been registered using background features, registration in this area will detect target object displacement relative to the background between successive frames. As illustrated in FIG. 12, step 12.10 performs the registration between the current frame and reference frame within the target object search area using Sum of Absolute Differences in the same way that step 10.2 performed registration of the background segments. In step 12.11, the target object displacement between the current frame and the reference frame is computed. The leftmost and rightmost edge displacements and the target object displacements are accumulated by process 5.0 Update Target Stats (FIG. 7), shown in detail in FIG. 13, since these parameters are required to predict position and perform the speed calculation. These parameters are updated with each new frame processed. As shown in FIG. 13, if a valid left edge has been detected, step 13.1, the left edge statistics are updated by step 13.2 as follows:

```
Sum_left_pos = Sum_left_pos + left_edge
Sum_left_frame = sum_left_frame + i
Sum_left_frame2 = Sum _left_frame2 + i²
Sum_left_framepos = Sum_left_framepos + i*right_edge
Num_left = Num_left + 1.
```

If a valid right edge has been detected, step 13.3, the right edge statistics are updated in a similar way by step 13.4. The target object displacement is accumulated in a similar way by step 13.5. Finally, step 13.6 keeps a running total of the background registration Figures of Merit for use in validating the final crossing speed solution.

As mentioned previously, if the background registration step was successful, the current frame is substituted for the original reference frame (Step 8.6 FIG. 8). If both the leftmost and rightmost edges were found, the reference target centre used in step 12.1 (FIG. 12) to isolate the target object search area or segment is the mean of these positions. If only one edge was found, that edge is used as the object segment centre. If no edges were found, the target object centre value for the reference is left unchanged. The other values for the reference are taken from the various inputs directly.

The statistics on the rightmost and leftmost edge displacements and the target object registration displacement are used by the Motion Detection section to compute least mean squared error regression lines for the points generated. The actual slope of the regression line is not computed until the crossing speed solution is generated.

Referring to FIG. 14, the crossing speed supplied to the ballistic computer is obtained by computing the slopes of target displacement, rightmost edge displacement and leftmost edge displacement and using a voting scheme to give the final crossing speed. Thus, step 14.1 fits the left edge statistics to a linear regression line on the basis of displacement versus frame number. A second regression line is developed in a similar manner by step 14.2 for the right edge statistics. A third regression line is computed (step 14.3) for the target object displacements.

In step 14.4, a mean FOM $\mu_r$ is computed, using the FOM values accumulated from the background registration process, as follows:

$$\mu_r = Sum\_Reg\_FOM/(N_{AD}+N_{BD}),$$

where $N_{AD}$ and $N_{BD}$ are the total number of frames after and before the lase or datum frame 0 in the buffer. In step 14.5, the variance $\Delta_s$ of the three slopes, i.e. the difference between the maximum slope and the minimum slope, is computed. Step 14.6 computes the average slope $\mu_s$ and step 14.7 computes the normalized variance, $\sigma_s = \Delta_s/\mu_s$ as a Figure of Merit (FOM) for the speed.

If the mean FOM $\mu_s$ is greater than a predetermined threshold $T_r$ (step 14.8) and the normalized variance $\sigma_s$ is less than a threshold $T_s$ (step 14.9), step 14.10 computes the crossing speed as the mean slope of the three regression lines $\mu_s$ scaled by a constant factor $R_o$ to convert pixels per frame to milliradians per second. The thresholds $T_r$ and $T_s$ are determined empirically from field tests.

The solution supplied to the ballistic computer 2 comprises two values, the speed in milliradians/second and a validity flag. If a valid solution could be determined, steps 14.8, 14.9 and 14.11 set the flag to "true" indicating that the speed estimate is reliable. If a reliable solution could not be found, the flag is set to "false".

It should be appreciated that the crossing speed calculated will be inadequate in certain circumstances, for example, where the target has little contrast relative to the background, perhaps because of camouflage, poor weather conditions or poor illumination. The background features required for registration may be indistinct due to type of terrain, lighting or weather so that registration cannot be performed properly. Although the process of determining regression lines from accumulated statistics effectively interpolates for momentary losses of target, excessive obscuration may be sufficient to prevent a reliable result being reached because of insufficient data. Multiple targets within the field of view of the sight are unlikely to degrade the registration of the background because of the relatively restricted viewing angle of the sensor. In the event, however, that such factors result in the speed calculation being judged unreliable by steps 14.8 and 14.9, the system may give an indication to that effect by way of display 37 (FIG. 1). The operator may then operate the rangefinder again to repeat the procedure, or enter a reasonable estimate of crossing speed manually, conveniently by way of manual interface 26.

The validation of the solution is extremely important. Generating an incorrect solution will guarantee that the round will miss the target, whereas giving no solution allows the operator to compensate manually for the target crossing speed.

Various modifications are envisaged within the scope and spirit of the invention. Thus, other techniques for generating the solution, such as using the median speed, using the speed with the best regression fit, or averaging the speeds of the two lines with the best fit, might be used to generate the ballistic solution though it is unlikely that they would provide performance improvements sufficient enough to justify their increased complexity.

While the preferred method of determining the success of the registration is to measure the SAD curve, other methods could be used, such as mean intensity difference between the aligned frames compared to a threshold, or detecting frame displacements that were significantly different from previous frame displacements.

The regression lines may be used to predict target edge positions to test the validity of new edges found and to predict the target centre to determine the target search and exclusion areas. While it would be possible to start predicting after a small number of points to validate the new edges, the preferred approach would be to postpone prediction until enough points had been found to ensure accuracy in the regression line. Since the algorithms would need to work without prediction for the period when the regression lines were being initialized, however, the benefit of prediction for a few frames might not justify the complexity and instability introduced by the section. The preferred algorithm is based upon the assumption that the target will still be in the target search area if this area is centred at the previous target centre and all edges positions are valid points in the regression statistics.

In the foregoing specific description, the sight is panned to follow the target between operation of the laser rangefinder and firing of the round. It should be appreciated, however, that panning is not essential. All that is required is that the target be centred when the rangefinder is operated and again when the round is fired.

The preferred registration process is less susceptible to error due to vertical jitter. When the weapon is hand held, there is usually a small component of vertical jitter as the gunner tracks the target. Since the vertical field of view of the sensor 20 is small, the successive linear scan images gathered by the data buffer 22 might not be for the same horizontal stripe of the scene. This could also affect the motion detection algorithm. The typical target is not characterized by vertical surfaces, so movement of the sensor vertically will usually be associated with a horizontal movement of the edge as detected. Consequently, vertical jitter could cause variation of the mean edge position. Embodiments of the invention which detect the leftmost and rightmost edges found in the target area are less sensitive to non-uniform targets, and targets that change appearance.

An advantage of using the most-recently registered frame as a reference frame, rather than simply aligning all subsequent frames to the so-called lase frame i.e. the frame corresponding to the operation of the laser rangefinder, is that the registration process is less likely to have difficulty with short range, fast moving targets. For example, assuming magnifications typical in weapon sights, with a target at a range of 300 meters, and a field of view of the sensor of approximately 9 meters, a target 7 meters wide will leave approximately 11 meters of background on each side of the target. If the target is moving at 60 kilometers per hour or 16.5 meters per second as the gunner tracks the target the background can move 8.25 meters in the field of view in the half second interval between the lase frame and the last frame gathered for registration purposes. In order to be able to detect such motion in either direction, the background segment of the frame would need to be registered across 16.5 meters in the field of view. This would be impossible since, as mentioned earlier, there is only 11 meters of background available.

If a target object is approaching, or receding from, the sight rapidly, it may move so far during the time-of-flight of the round that the round will miss the target. This is especially likely when smaller, recoilless weapons, which fire relatively slow rounds, are used for target objects which are relatively distant. In order to improve accuracy in such circumstances, two range measurements may be made a few seconds apart. The difference between the two can be used to calculate "closing" speed i.e. the speed at which the object is approaching, or receding from the target. One of the range measurements, conveniently the second, can be used to initiate the crossing speed calculation. For example, in the embodiment of FIG. 1, when the gunner operated the laser rangefinder 25 a first time, the ballistic computer 24 would start a timer. When the gunner operated the laser rangefinder 25 again, a few seconds later, the ballistic computer 24 would stop the timer and compute the closing speed. The ballistic computer 24 would then compensate for both closing speed and crossing speed of the target object.

It is envisaged that at least the crossing speed calculator 23 and ballistics computer 24 will be implemented using one or more digital signal processors.

Although a CCD array sensor has been described, thermal, acoustic, or other suitable image-forming sensors could be substituted.

Although the specific embodiment described herein is for a weapon aiming system, it should be appreciated that the invention is not limited to weaponry but could be applied more generally wherever crossing speed of an object is to be derived, for example in robotics or computer aided manufacturing.

Although an embodiment of the invention has been described and illustrated in detail, it is to be clearly understood that the same is by way of illustration and example only and is not to be taken by way of limitation, the spirit and scope of the present invention being limited only by the appended claims.

PROCESS VARIABLES

| | |
|---|---|
| c | The current frame of data (the one being processed). |
| $d_c$ | The accumulated background registration displacement for the current frame. |
| $d_{min}$ | The displacement of d where the SAD value ($SAD_d$) was a minimum. |
| $d_r$ | The accumulated background registration displacement of the reference frame. |
| $\Delta_s$ | The magnitude of the difference between the largest and smallest regression slope values. |
| $d_t$ | The target registration displacement for the current frame. |
| e[j] | The magnitude of the difference on the pixels intensities in the target area. |
| i | The current frame number where the Datum Frame is i = 0, the one before i = −1 and the one after i = 1. |
| j | A loop variable used to specify the displacement value tested. |
| left | A temporary variable holding the position of the leftmost edge. |
| Left_edge | The final value for the leftmost edge (either the position or a NOT_FOUND status). |
| Mean_Diff | The mean of the magnitude of difference between registered pixels in the background segment of the frame. |

-continued

| | |
|---|---|
| mean_SAD | The mean of the $SAD_d$ values (for the full range of d ($-N_{BRD} < d < N_{BRD}$). |
| min_SAD | The minimum of the $SAD_d$ values determined (for the full range of d ($-N_{BRD} < d < N_{BRD}$). |
| $\mu_r$ | The average of the Reg_FOM values determined by the registration section. Used to test the confidence in the registration solution. |
| $\mu_s$ | The average of the three regression slope values. |
| r | The reference frame of pixel values (an array). |
| Reg_FOM | The figure of merit confidence check from the registration process. |
| right | A temporary variable holding the position of the rightmost edge. |
| right_edge | The final value for the rightmost edge (either the position or a NOT_FOUND status) |
| SAD[d] | The Sum of Absolute Differences value for a specific displacement tested. |
| Search_Area | The object segment within the frame that contains a majority of target object pixels. |
| $\sigma_s$ | A measure of the variance of the three regression slope values. |

CONSTANT THRESHOLDS AND IMPLEMENTATION DEPENDENT VALUES

| | |
|---|---|
| $N_{AD}$ | Number of frames gathered after the Datum Frame. |
| $N_{BD}$ | Number of frames gathered before the Datum Frame. |
| $N_{BRD}$ | Specifies the range of displacements to test in the background registration process. This range will be from $-N_{BRD}$ to $N_{BRD}$. |
| $N_{TRD}$ | Specifies the range of displacements to test in the target registration process. This range will be from $-N_{TRD}$ to $N_{TRD}$. |
| $R_o$ | A fixed conversion factor between speed in pixels per frame to speed in milliradians per second. |
| $T_e$ | A value used to scale up the Mean_Diff to generate an edge magnitude threshold. |
| $T_r$ | The threshold for the Reg_FOM, to indicate a successful registration. |
| $T_s$ | The threshold for the speed variance measure. The maximum allowable value. |

We claim:

1. Apparatus for determining the speed of an object moving relative to a scene comprising:
   means (20, 21, 22) for providing a plurality of frames of data representing successive images of at least a portion of the scene, each frame comprising an object segment, in which features of the object predominate, and at least one background segment comprising part of the frame excluding the object segment;
   means (23; 8.3) for effecting registration of features in a background segment of one of said plurality of frames with corresponding features in a background segment of a reference frame comprising a different one of said plurality of frames;
   means (23; 8.5, 8.7) for determining displacement of features in said object segment of said one of said plurality of frames relative to the registered background segment features; and
   means (23; 8.14) for computing from the displacement of the object features over a predetermined number of frames, the speed of movement of the object relative to the background features.

2. Apparatus as claimed in claim wherein said registration effecting means includes means (8.1, 8.4, 8.6) for initially selecting a first of said plurality of frames as said reference frame and, when a subsequent frame has been registered successfully, substituting such subsequent frame as said reference frame for use in registering succeeding frames.

3. Apparatus as claimed in claim 1, wherein the registration effecting means includes means (10.2) for incrementally displacing intensity values of said one frame relative to intensity values of said reference frame and determining, at each displacement position, the difference between respective intensity values of individual elements of said one frame and said reference and, in dependence upon such determination, selecting one such displacement position as constituting registration.

4. Apparatus as claimed in claimed in claim 3, wherein the determining means determines a sum of absolute differences between intensity values of all said individual elements.

5. Apparatus as claimed in claim 3, further comprising means (10.4) for deriving a quality estimate for registration.

6. Apparatus as claimed in claim 5, wherein the means for deriving the quality estimate computes the quality estimate as the ratio between the mean of all of the sum of absolute differences values and the minimum value and compares such ratio with a reference.

7. Apparatus as claimed in claim 4, further comprising means (10.2) for verifying the registration by computing, for the displacement selected as constituting registration, the ratio between the mean value of the sums of absolute differences and the minimum such sum of absolute differences and comparing the ratio with a reference value.

8. Apparatus as claimed in claim 7, further comprising means (8.4) for indicating when the quality estimate is inadequate.

9. Apparatus as claimed in claim 1, wherein the object feature displacement determining means includes means for detecting (12.2, 12.3) in each frame at least one transition corresponding to an edge of the object and determining (13.2, 13.4) displacement of such transition over a said predetermined number of frames.

10. Apparatus as claimed in claim 9, wherein said means for detecting serves to detect (12.3, 12.9) transitions corresponding to leading and trailing edges, respectively, of said object.

11. Apparatus as claimed in claim 9, wherein said means for determining displacement of said transition comprises means for deriving (14.1, 14 2) a linear regression for said transition over said plurality of frames.

12. Apparatus as claimed in claim 10, wherein said means for determining displacement of said transition comprises means for deriving (14.1, 14.2) a linear regression for said transition over said plurality of frames.

13. Apparatus as claimed in claim 1, further comprising means for effecting (12.10, 12.11) registration of features in the object segment of said one of said plurality of frames with corresponding features in said object segment of said reference frame;
said object feature displacement determining means including means for determining (14.3) displacement of object features over said predetermined number of frames.

14. Apparatus as claimed in claim 1, further comprising means for effecting (12.10, 12.11) registration of features in the object segment of said one of said plurality of frames with corresponding features in said object segment of said reference frame, said object feature displacement determining means including means for determining (14.3) displacement of object features over said predetermined number of frames, and means for detecting (12.2, 12.3) in each frame at least one transition corresponding to an edge of the object and determining cumulative displacement of such transition over a said predetermined number of frames, the means for computing object speed serving to compute such speed from both the displacement of object features and the cumulative displacement of said transition.

15. Apparatus as claimed in claim 14, further comprising means (14.4) for verifying the computed speed in dependence upon the variance of the displacements of said transitions and said object features.

16. Apparatus as claimed in claim 15, wherein said registration means comprises means for deriving a quality estimate for the registration of the background segment and the computed speed verification is also dependent upon said quality estimate.

17. Apparatus as claimed in claim 1, wherein said means for providing a plurality of frames of data includes sensor means (20) for providing said images and storage means for storing a said plurality of said frames.

18. Apparatus as claimed in claim 1, further comprising means (25) for determining the range of the object, said means for providing being responsive to the range determining means to provide said plurality of frames.

19. Apparatus as claimed in claim 1, wherein said means for providing a plurality of frames comprises storage means (22) for storing said plurality of frames on a first-in first-out basis and means for selecting one of said plurality of frames as an initial reference.

20. Apparatus as claimed in claim 19, wherein the selecting means selects a medial one of said plurality of frames as said initial reference.

21. Apparatus as claimed in claim 1, further comprising means (25) for determining the range of the object and means for determining (12.1) the relative sizes of the background segment and object segment in dependence upon such range.

22. Apparatus as claimed in claim 1, further comprising means for determining the range of the object, said means for computing further comprising means for measuring a time interval between successive range measurements and computing therefrom the speed at which the object is approaching or receding from the apparatus.

23. Apparatus as claimed in claim 1, wherein the means for providing a plurality of images comprises a linear CCD array (20) positioned to provide images for a line extending in the direction of movement of the object.

24. Apparatus as claimed in claim 1, further comprising means for compensating (10.1) for differing sensitivities of elements of the sensor.

25. Apparatus as claimed in claim 1, wherein the means for providing a plurality of images comprises sensor means comprising a plurality of elements configured spatially to correspond to characteristics of the background features or object features.

26. A method of determining the speed of an object moving relative to a scene comprising the steps of:
providing a plurality of frames of data representing successive images of at least a portion of the scene, each frame comprising an object segment, in which features of the object predominate, and a background segment comprising parts of the frame excluding the object segment and in which features of the object do not predominate;

effecting registration (8.3) of features in a background segment of one of said plurality of frames with corresponding features in a background segment of a reference frame comprising a different one of said plurality of frames;

determining displacement (8.5, 8.7) of features in said object segment of said one of said plurality of frames relative to the registered background segment features; and computing (8.14), from the displacement of the object features over a predetermined number of frames, the speed of movement of the object relative to the background features.

27. A method as claimed in claim 26, wherein the step of effecting registration includes selecting initially (8.2) a first of said plurality of frames as said reference frame and, when a frame has been registered successfully, substituting (8.6) such registered frame as said reference frame for use in registering subsequent frames.

28. A method as claimed in claim 26, wherein the step of effecting registration includes incrementally displacing (10.2) intensity values said one frame relative to intensity values of said reference frame and determining, at each displacement position, the difference between respective intensity values of individual elements of said one frame and said reference and, in dependence upon such determination, selecting (10.3) one such displacement position as constituting registration.

29. A method as claimed in claim 26, wherein the step of determining the difference in respective intensity values includes determining a sum of absolute differences between intensity values of all said individual elements.

30. A method as claimed in claim 26, further comprising the step (10.4) of deriving a quality estimate for the registration.

31. A method as claimed in claim 29, wherein the step of deriving the quality estimate includes the step of computing the ratio between the mean of all of the sum of absolute differences values and the minimum value and comparing such ratio with a reference.

32. A method as claimed in claim 30, further comprising the step (10.2) of deriving a quality estimate for the registration by computing, for the displacement selected as constituting registration, the ratio between the mean value of the sums of absolute differences and the minimum such sum of absolute differences and comparing the ratio with a threshold value.

33. A method as claimed in claim 31, further comprising the step (8.4) of indicating when the quality estimate for registration is inadequate.

34. A method as claimed in claim 26, wherein the step of determining object feature displacement includes the step of detecting (12.2, 12.3) in each frame at least one transition corresponding to an edge of the object and determining displacement of such transition over a said predetermined number of frames.

35. A method as claimed in claim 34, wherein the step of detecting includes detecting (12.3-12.9) transitions corresponding to leading and trailing edges, respectively, of said object.

36. A method as claimed in claim 34, wherein said step of determining displacement of said transition includes the step of deriving (14.4, 14.2) a linear regression for said transition over said plurality of frames.

37. A method as claimed in claim 35, wherein said step of determining displacement of said transition includes the step (14.1, 14.2) of deriving a linear regression for said transition over said plurality of frames.

38. A method as claimed in claim 26, further comprising the step (12.10, 12.11) of effecting registration of features in the object segment of said one of said plurality of frames with corresponding features in said object segment of said reference frame;

said step of determining displacement of features including the step (14.3) of determining displacement of object features over said plurality of frames.

39. A method as claimed in claim 26, further comprising the step (12.10, 12.11) of effecting registration of features in the object segment of said one of said plurality of frames with corresponding features in said object segment of said reference frame, said step of determining displacement of features including the step (14.3) of determining displacement of object features over said predetermined number of frames, and detecting (12.2, 12.3) in each frame at least one transition corresponding to an edge of the object and determining displacement of such transition over a said predetermined number of frames, the step of computing object speed computing such speed from both the displacement of object features and the displacement of said transition.

40. A method as claimed in claim 39, further comprising the step (14.4) of verifying the computed speed on the basis of the variance of the displacements of said transition and said object features.

41. A method as claimed in claim 40, wherein the registration step includes the step of deriving a quality estimate for the registration of the background segment and verification of the computed speed is based also upon such quality estimate.

42. A method as claimed in claim 26, further comprising the step of determining the range of the object, the plurality of frames being determined in dependence upon the range determination.

43. A method as claimed in claim 26, wherein the step of providing a plurality of frames comprises (6.1, 6.2) storing said plurality of frames on a first-in first-out basis and selecting (6.3; 8.1) one of said plurality of frames as an initial reference.

44. A method as claimed in claim 43, wherein the frame selected as an initial reference comprises a medial one of said plurality of frames.

45. A method as claimed in claim 26, further comprising the step of determining the range of the object and adjusting (12.1) the relative sizes of the background segment and object segment in dependence upon such range.

46. A method as claimed in claim 26, further comprising the step of measuring the range of the object, measuring the time interval between successive range measurements, and computing therefrom the speed at which the object is approaching, or receding from the observer.

47. A method as claimed in claim 26, wherein each of the plurality of images is derived by a linear sensor extending in the direction of movement of the object.

48. A method as claimed in claim 47, further comprising the step (1.0) of compensating for differing sensitivities of elements of the sensor.

* * * * *

UNITED STATES PATENT AND TRADEMARK OFFICE
CERTIFICATE OF CORRECTION

PATENT NO. : 5,194,908
DATED : March 16, 1993
INVENTOR(S) : James H. Lougheed and Mark Wardell It is certified that error appears in the above-identified patent and that said Letters Patent is hereby corrected as shown below:

Col. 6, line 29:     After "number", insert --"1"--

Col. 9, line 6:     In the equation, after "d" insert "$\epsilon$"

Col. 12, line 60:     Delete "9" and substitute --29--

Signed and Sealed this

First Day of February, 1994

Attest:

BRUCE LEHMAN

Attesting Officer     Commissioner of Patents and Trademarks